United States Patent
Bundy et al.

(10) Patent No.: US 12,330,247 B2
(45) Date of Patent: Jun. 17, 2025

(54) METAL-CORED WIRE ELECTRODE FOR HIGH DEPOSITION RATE WELDING PROCESSES

(71) Applicant: Hobart Brothers LLC, Troy, OH (US)

(72) Inventors: Joseph C. Bundy, Piqua, OH (US); Steven E. Barhorst, Sidney, OH (US); Sindhu H. Thomas, Beavercreek, OH (US); Mario A. Amata, Dublin, OH (US)

(73) Assignee: HOBART BROTHERS LLC, Troy, OH (US)

( * ) Notice: Subject to any disclaimer, the term of this patent is extended or adjusted under 35 U.S.C. 154(b) by 23 days.

(21) Appl. No.: 17/350,907

(22) Filed: Jun. 17, 2021

(65) Prior Publication Data
US 2021/0402501 A1 Dec. 30, 2021

Related U.S. Application Data

(60) Provisional application No. 63/046,349, filed on Jun. 30, 2020.

(51) Int. Cl.
*B23K 9/10* (2006.01)
*B23K 35/02* (2006.01)
(Continued)

(52) U.S. Cl.
CPC ........ *B23K 9/1093* (2013.01); *B23K 35/0261* (2013.01); *B23K 35/264* (2013.01);
(Continued)

(58) Field of Classification Search
CPC ........................... B23K 35/00; B23K 35/0261; B23K 35/0266; B23K 35/22; B23K 35/264;
(Continued)

(56) References Cited

U.S. PATENT DOCUMENTS

| 6,339,209 B1 * | 1/2002 | Kotecki | B23K 35/368 |
| | | | 219/146.1 |
| 2015/0027993 A1 * | 1/2015 | Bruck | B23K 35/362 |
| | | | 148/26 |
| 2018/0264580 A1 * | 9/2018 | Schaeffer | B23K 9/186 |

FOREIGN PATENT DOCUMENTS

| EP | 2178671 | 4/2010 |
| EP | 2464489 | 6/2012 |

(Continued)

OTHER PUBLICATIONS

EPO, "Extended European Search Report," issued in application No. 21182264.8, Nov. 19, 2021, 9 pages.

*Primary Examiner* — Dana Ross
*Assistant Examiner* — Adam M Eckardt
(74) *Attorney, Agent, or Firm* — McAndrews Held & Malloy, Ltd.

(57) ABSTRACT

The present disclosure relates generally to an improved design of a metal-cored welding wire electrode for use on a high deposition rate welding process that resistively preheats the wire prior to being subjected to the welding current. The preheat circuit reduces the welding current drawn by the electrode so that higher wire feed speeds, and thus higher deposition rates, may be obtained. The metal-cored welding wire includes both a higher fill rate (a greater percentage of the welding wire is the granular core) along with added sulfur and an added bead wetting agent. The bead wetting agent may be one or more of selenium, tellurium, arsenic, gallium, bismuth, and tin. The improved metal-cored welding wire leads to an enhanced weld deposit appearance that means the weld deposits are less likely to be rejected as unusable.

20 Claims, 6 Drawing Sheets

(51) Int. Cl.
  *B23K 35/26* (2006.01)
  *B23K 35/28* (2006.01)
  *B23K 35/30* (2006.01)
  *B23K 35/40* (2006.01)

(52) U.S. Cl.
  CPC ........ *B23K 35/284* (2013.01); *B23K 35/3086* (2013.01); *B23K 35/40* (2013.01)

(58) Field of Classification Search
  CPC .. B23K 35/284; B23K 35/30; B23K 35/3066; B23K 35/3086; B23K 35/362; B23K 35/365; B23K 35/368; B23K 35/40; B23K 35/406; B23K 9/1093; B23K 35/02; B23K 35/26; B23K 35/28; B23K 9/10
  See application file for complete search history.

(56) References Cited

FOREIGN PATENT DOCUMENTS

| | | | |
|---|---|---|---|
| EP | 2836330 | 2/2015 | |
| EP | 3019304 | 5/2016 | |
| EP | 3075488 | 10/2016 | |
| EP | 3075488 A1 * | 10/2016 | ............. B23K 35/02 |
| EP | 3130425 | 2/2017 | |
| EP | 3666452 | 6/2020 | |

* cited by examiner

METAL-CORED WIRE ELECTRODE FOR HIGH DEPOSITION RATE WELDING PROCESSES

CROSS-REFERENCE TO RELATED APPLICATIONS

This application claims benefit of priority to U.S. provisional patent application No. 63/046,349, entitled "METAL-CORED WIRE ELECTRODE FOR HIGH DEPOSITION RATE WELDING PROCESSES", filed Jun. 30, 2020, the contents of which are herein incorporated by reference in their entirety.

BACKGROUND

Arc welding is commonly used in numerous applications such as shipbuilding, offshore platform, construction, heavy equipment, pipe mills, and so forth. Certain arc welding processes (e.g., Gas Metal Arc Welding (GMAW) and Metal-cored Arc Welding (MCAW)) utilize welding wire, which generally provides a supply of filler metal for the weld deposit and provides a path for current during the arc welding process. Tubular welding wire, for example, includes a metallic sheath encircling a granular core. In particular, metal-cored welding wires are a type of tubular welding wire that generally produce a substantially slag-free weld deposit, which reduces post-weld processing compared to other types of tubular welding wire, such as flux-cored tubular welding wires.

Gas metal arc welding (GMAW) is an electric arc welding process using an arc between a continuous filler metal electrode and the weld pool with externally supplied shielding gas. Certain efforts to increase deposition rate include feeding multiple wires into a weld pool, running multiple arcs into a weld pool, and running a hybrid laser/GMAW process. Multiple arc processes are difficult to manage due to limited access to the weld joint and electromagnetic interactions. Higher deposition rates are restricted because weld bead profiles become convex and the weld surface becomes less appealing as the heat input required to burn off welding consumables increases. At welding currents over approximately 400 amps, the weld surface tends to become heavily oxidized, more convex with less useful weld metal, and has unattractive, coarse freeze lines.

Thus, there exists a need for improved design of a metal-cored welding wire electrode for use on a high deposition rate welding process that resistively preheats the wire prior to being subjected to the welding current. The metal-cored welding wire of the present disclosure uses multiple surface active elements to perform two key functions. First, the components modify the surface tension so that the weld metal flows easily and smoothly into the base metal allowing for faster travel speeds to be achieved. These components also modify the flow characteristics of the silicate islands that form and pull them away from the weld toe lines allowing for better wetting and easy removal. Second, the metal-cored wire uses a higher level of fill, reducing the wall thickness. This, in turn, reduces the welding amperage drawn to burn off the wire at a given wire feed rate. Because of the lower welding amperage, the thinner walled metal-cored electrode can use a higher wire feed rate in order to deposit even more weld metal yet stay below a critical amperage where undesirable weld appearance ("cooked" appearance) occurs.

BRIEF DESCRIPTION

In an embodiment, a metal-cored welding wire includes a metallic sheath encapsulating a granular core, wherein the granular core comprises between 20 and 30 wt. % of the metal-cored welding wire electrode. The metal-cored welding wire electrode includes, by weight of the metal-cored welding wire electrode: 0.01 to 0.03 wt. % sulfur, 0 to 0.12 wt. % carbon, 0.01 to 0.15 wt. % of a bead wetting agent, and 0 to 1 wt. % nickel. The bead wetting agent may be one or more of selenium, tellurium, arsenic, gallium, bismuth, and tin.

In another embodiment, a method for high deposition rate welding includes resistively preheating a metal-cored welding wire electrode comprising a metallic sheath encapsulating a granulated core, establishing an arc between the metal-cored welding wire electrode and a workpiece, and melting at least a portion of the metal-cored welding wire electrode and at least a portion of the workpiece using the heat of the arc to form a weld deposit. The metal-cored welding wire electrode includes, by weight of the metal-cored welding wire electrode: 0.01 to 0.03 wt. % sulfur, 0 to 0.12 wt. % carbon, 0.01 to 0.15 wt. % of a bead wetting agent, and 0 to 1 wt. % nickel. The bead wetting agent may be one or more of selenium, tellurium, arsenic, gallium, bismuth, and tin.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DRAWINGS

The following is a description of the examples depicted in the accompanying drawings. The figures are not necessarily to scale, and certain features and certain views of the figures may be exaggerated in scale or in schematic for clarity or conciseness.

The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, specific details may be set forth to provide a thorough understanding of the embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify common or similar elements.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, as used herein, "approximately" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value. Likewise, two values described as being "substantially the same" or "substantially similar" are approximately the same, and a material that is described as being "substantially free" of a substance includes approximately 0% of the substance. The terms "metal-core" and "metal-cored" are used herein to refer to tubular wires having a metallic sheath and a granular core, wherein the core primarily includes metallic alloying powders with low amounts (i.e., less than about 5 wt. %) of non-metallic components (e.g., slag forming agents, metal oxides, stabilizers). For example, see ANSI/ANS A5.9 Specifications for Bare Stainless Steel Welding Electrodes and Rods. As used herein, the term "non-metallic component" refers to elements and compounds of elements that are not metals or metalloids (e.g., hydrogen, carbon, nitrogen, oxygen, phosphorous, sulfur, halides).

The present disclosure relates to an improved design of a metal-cored welding wire electrode for use on a high deposition rate welding process that resistively preheats the wire prior to being subjected to the welding current. The preheat circuit reduces the welding current drawn by the electrode so that higher wire feed speeds, and thus higher deposition rates, may be obtained. Further, the improved metal-cored welding wire reduces the welding current, which allows one to use higher wire feed speeds for further productivity gains. The metal-cored electrode has surface active elements that allow faster travel speeds because the weld bead wets out easier and produces silicate islands on the weld surface that are more easily removed. Without improved wetting, the weld deposit can have a "cooked" appearance, which may lead to the weld deposit being rejected as unusable. The improved metal-cored welding wire leads to an enhanced weld deposit appearance that means the weld deposits are less likely to be rejected as unusable. This productive weld process can deposit at a rate of 800 to 1000 inches per minute.

Metal-cored welding wires according to the present disclosure allow for high deposition rate welding without the production of weld deposits with an undesirable weld appearance ("cooked" look). The improved metal-cored welding wire desire results from the combination of a higher fill level (higher percentage of granular core relative to the sheath) with the inclusion of both sulfur and one or more of selenium, tellurium, arsenic, gallium, bismuth, or tin. The higher fill rate leads to a lower welding current and helps with bead wetting. The inclusion of sulfur allows for faster travel speeds and also helps with bead wetting. The inclusion of one or more of selenium, tellurium, arsenic, gallium, bismuth, or tin also helps with bead wetting. Metal-core welding wires according to the present disclosure can be deposited at a rate of 800 to 1000 inches per minute without an undesirable weld appearance. A weld deposit or bead with an undesirable appearance may be ropey or crowned, and can also have mechanical issues. Metal-cored welding wire electrodes according to the present disclosure may comprise a metallic sheath encapsulating a granular core. Metal-cored welding wire electrodes according to the present disclosure may comprise sulfur, carbon, a bead wetting agent (one or more of selenium, tellurium, arsenic, gallium, bismuth, and tin), and nickel. Metal-cored welding wire electrodes according to the present disclosure may have a high fill rate (e.g., a granular core that comprises between approximately 20 and approximately 30 wt. % of the metal-cored welding wire). The combination of the sulfur and bead wetting agent additions along with the high fill rate has been found to contribute to enhanced bead wetting, leading to more consistent and reliable weld deposits that do not have a "cooked" appearance.

Figure 1A:
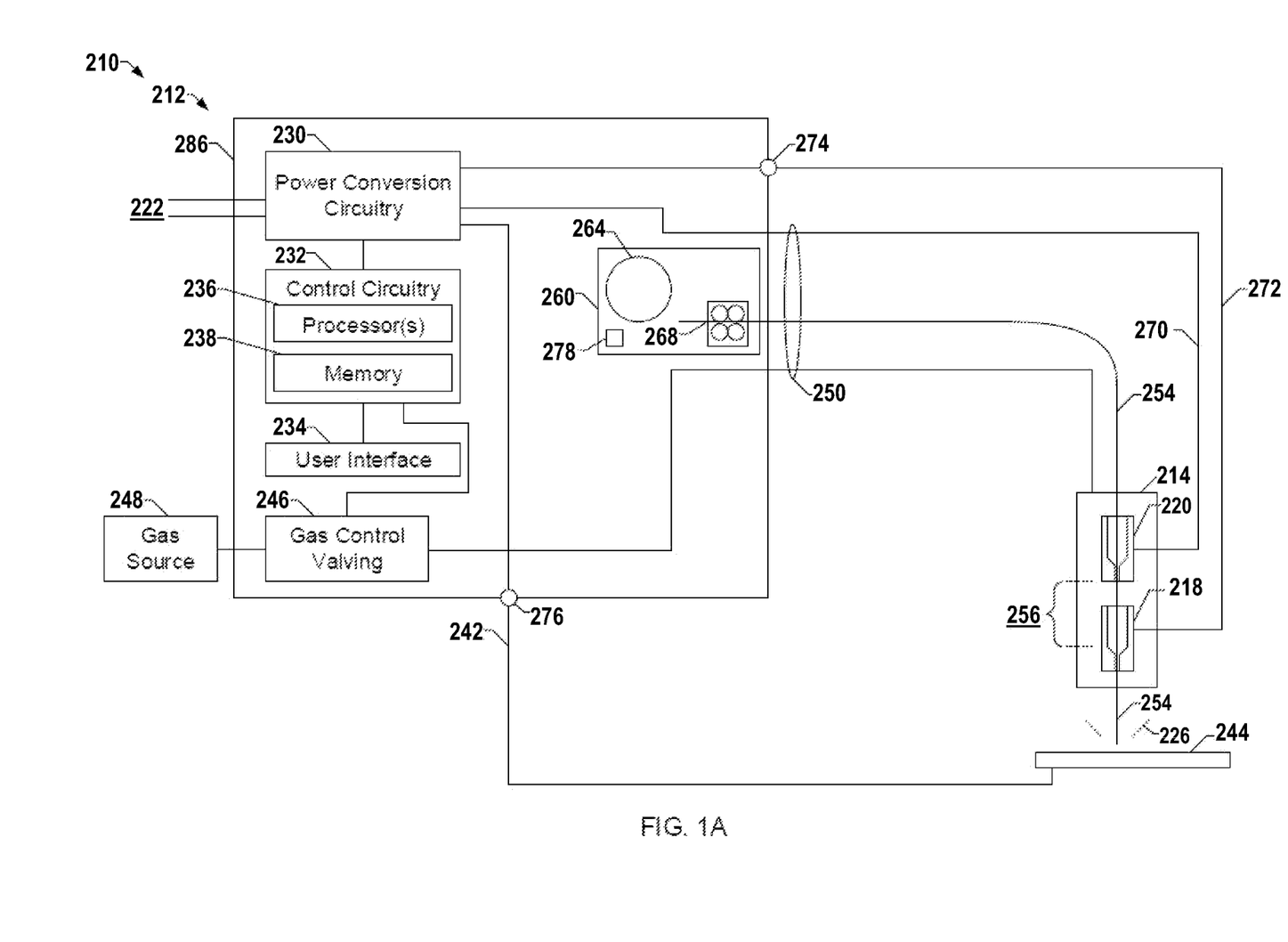
FIG. 1A illustrates an example welding system including a welding power supply configured to convert input power to welding power and preheating power, in accordance with aspects of this disclosure.

Turning to the figures, FIG. 1A illustrates an example welding system 210, including a welding power supply 212 configured to convert input power to welding power and preheating power. The example welding system 210 of FIG. 1A includes the welding power supply 212 and a preheating welding torch 214. The welding torch 214 may be a torch configured for any wire-fed welding process, such as gas metal arc welding (GMAW), flux cored arc welding (FCAW), self-shielded FCAW, or submerged arc welding (SAW), based on the desired welding application.

The welding power supply 212 converts the input power from a source of primary power 222 to one or both of output welding power and preheating power, which are output to the welding torch 214. In the example of FIG. 1A, the welding power source also supplies the filler metal to a welding torch 214 configured for GMAW welding, FCAW welding, or SAW welding.

The welding power supply 212 is coupled to, or includes, the source of primary power 222, such as an electrical grid or engine-driven generator that supplies primary power, which may be single-phase or three-phase AC power. For example, the welding power supply 212 may be an engine-driven welding power source that includes the engine and generator that provides the primary power 222 within the welding power supply 212. The welding power supply 212 may process the primary power 222 to output welding-type power for output to the welding torch 214 via an torch cable 250.

Power conversion circuitry 230 converts the primary power (e.g., AC power) to welding-type power as either direct current (DC) or AC, and to preheating power. Example preheating power may include DC or AC electrical current that provides resistive, or Joule, heating when conducted through a portion of the electrode wire 254. Additional examples of preheating power disclosed herein may include high frequency AC current that provides inductive heating within the electrode wire 254, or power suitable for hotwire techniques, arc-based preheating in which an electrical arc is used to apply heat to the wire prior to the welding arc, laser-based preheating, radiant heating, convective heating, or any other forms of wire heating. The power conversion circuitry 230 may include circuit elements such as transformers, switches, boost converters, inverters, buck converters, half-bridge converters, full-bridge converters, forward converters, flyback converters, an internal bus, bus capacitor, voltage and current sensors, or any other topologies or circuitry to convert the input power to the welding power and the preheating power, and to output the welding power and the preheating power to the torch 214. Example implementations of the power conversion circuitry 230 are disclosed below in more detail.

The first and second portions of the input power may be divided by time (e.g., the first portion is used at a first time and the second portion is used at a second time) or as portions of the total delivered power at a given time. The power conversion circuitry 230 outputs the welding power to a weld circuit, and outputs the preheating power to a preheating circuit or other preheater. The weld circuit and the preheating circuit may be implemented using any combination of the welding torch 214, a weld accessory, and the power supply 212.

The power conversion circuitry 230 may include circuit elements such as boost converters. In some examples, the primary power 222 received by the power conversion circuitry 230 is an AC voltage between approximately 110V and 575V, between approximately 110V and 480V, or between approximately 110V and 240V. As used in reference to the input power, the term approximately may mean within 5 volts or within 10 percent of the desired voltage.

The power conversion circuitry 230 may be configured to convert the input power to any conventional or future welding-type output. The example power conversion circuitry 230 may implement one or more controlled voltage control loop(s), one or more controlled current control loop(s), one or more controlled power control loops, one or more controlled enthalpy control loops, or one or more controlled resistance control loops to control the voltage or current output to the welding circuit or to the preheating circuit. As described in more detail below, the power conversion circuitry 230 may be implemented using one or more converter circuits, such as multiple converter circuits in which each of the welding-type output and the preheating output is produced using separate ones of the converter circuits.

In some examples, the power conversion circuitry 230 is configured to convert the input power to a controlled waveform welding output, such as a pulsed welding process or a short circuit welding process (e.g., regulated metal deposition (RMD™)). For example, the RMD™ welding process utilizes a controlled waveform welding output having a current waveform that varies at specific points in time over a short circuit cycle.

The welding power supply 212 includes control circuitry 232 and an user interface 234. The control circuitry 232 controls the operations of the welding power supply 212 and may receive input from the user interface 234 through which an operator may choose a welding process (e.g., GMAW, FCAW, SAW) and input desired parameters of the input power (e.g., voltages, currents, particular pulsed or non-pulsed welding regimes, and so forth). The control circuitry 232 may be configured to receive and process a plurality of inputs regarding the performance and demands of the system 210.

The control circuitry 232 includes one or more controller(s) or processor(s) 236 that controls the operations of the power supply 212. The control circuitry 232 receives and processes multiple inputs associated with the performance and demands of the system. The processor(s) 236 may include one or more microprocessors, such as one or more "general-purpose" microprocessors, one or more special-purpose microprocessors or ASICS, one or more microcontrollers, or any other type of processing or logic device. For example, the control circuitry 232 may include one or more digital signal processors (DSPs). The control circuitry 232 may include circuitry such as relay circuitry, voltage and current sensing circuitry, power storage circuitry, or other circuitry, and is configured to sense the primary power 222 received by the power supply 212.

The example control circuitry 232 includes one or more memory device(s) 238. The memory device(s) 238 may include volatile or nonvolatile memory or storage devices, such as random access memory (RAM), read only memory (ROM), flash memory, hard drives, solid state storage, or any other suitable optical, magnetic, or solid-state storage mediums. The memory device(s) 238 store data (e.g., data corresponding to a welding application), instructions (e.g., software or firmware to perform welding processes), or any other appropriate data. Examples of stored data for a welding application include an attitude (e.g., orientation) of a welding torch, a distance between the contact tip and a workpiece, a voltage, a current, welding device settings, and so forth. The memory device 238 may store machine executable instructions (e.g., firmware or software) for execution by the processor(s) 236. Additionally or alternatively, one or more control schemes for various welding processes, along with associated settings and parameters, may be stored in the memory device(s) 238, along with machine executable instructions configured to provide a specific output (e.g., initiate wire feed, enable gas flow, capture welding current data, detect short circuit parameters, determine amount of spatter) during operation.

The example user interface 234 enables control or adjustment of parameters of the welding system 210. The user interface 234 is coupled to the control circuitry 232 for operator selection and adjustment of the welding process (e.g., pulsed, short-circuit, FCAW) through selection of the wire size, wire type, material, and gas parameters. The user interface 234 is coupled to the control circuitry 232 for control of the voltage, amperage, power, enthalpy, resistance, wire feed speed, and arc length for a welding application. The user interface 234 may receive inputs using any input device, such as via a keypad, keyboard, buttons, touch screen, voice activation system, wireless device, etc.

The user interface 234 may receive inputs specifying wire material (e.g., steel, aluminum), wire type (e.g., solid, cored), wire diameter, gas type, or any other parameters.

Upon receiving the input, the control circuitry 232 determines the welding output for the welding application. For example, the control circuitry 232 may determine weld voltage, weld current, wire feed speed, inductance, weld pulse width, relative pulse amplitude, wave shape, preheating voltage, preheating current, preheating pulse, preheating resistance, preheating energy input, or any other welding or preheating parameters for a welding process based at least in part on the input received through the user interface 234.

In some examples, the welding power supply 212 may include polarity reversing circuitry. Polarity reversing circuitry reverses the polarity of the output welding-type power when directed by the control circuitry 232. For example, some welding processes, such as TIG welding, may enable a desired weld when the electrode has a negative polarity, known as DC electrode negative (DCEN). Other welding processes, such as stick or GMAW welding, may enable a desired weld when the electrode has a positive polarity, known as DC electrode positive (DCEP). When switching between a TIG welding process and a GMAW welding process, the polarity reversing circuitry may be configured to reverse the polarity from DCEN to DCEP.

Additionally or alternatively, the operator may simply connect the torch 214 to the power supply 212 without knowledge of the polarity, such as when the torch is located a substantial distance from the power supply 212. The control circuitry 232 may direct the polarity reversing circuitry to reverse the polarity in response to signals received through communications circuitry, or based on a selected or determined welding process.

In some examples, the power supply 212 includes communications circuitry. For example, communications circuitry may be configured to communicate with the welding torch 214, accessories, or other device(s) coupled to power cables or a communications port. The communications circuitry sends and receives command or feedback signals over welding power cables used to supply the welding-type power. Additionally or alternatively, the communications circuitry may communicate wirelessly with the welding torch 214 or other device(s).

For some welding processes (e.g., GMAW), a shielding gas is utilized during welding. In the example of FIG. 1A, the welding power supply 212 includes one or more gas control valves 246 configured to control a gas flow from a gas source 248. The control circuitry 232 controls the gas control valves 246. The welding power supply 212 may be coupled to one or multiple gas sources 248 because, for example, some welding processes may utilize different shielding gases than others. In some examples, the welding power supply 212 is configured to supply the gas with the welding power or the preheating power to the torch 214 via a combined torch cable 250. In other examples, the gas control valves 246 and gas source 248 may be separate from the welding power supply 212. For example, the gas control valves 246 may be disposed connected to the combined torch cable 250 via a connector.

The example power supply 212 includes a wire feed assembly 260 that supplies electrode wire 254 to the welding torch 214 for the welding operation. The wire feed assembly 260 includes elements such as a wire spool 264 and a wire feed drive configured to power drive rolls 268. The wire feed assembly 260 feeds the electrode wire 254 to the welding torch 214 along the torch cable 250. The welding output may be supplied through the torch cable 250 coupled to the welding torch 214 or the work cable 242 coupled to the workpiece 244. As disclosed in more detail below, the preheating output may be supplied to the welding torch 214 (or another via a connection in the wire feed assembly 260), supplied to the welding torch 214 via one or more preheating power terminals, or supplied to a preheater within the wire feed assembly 260 or otherwise within a housing 286 of the welding power supply 212.

The example power supply 212 is coupled to a preheating GMAW torch 214 configured to supply the gas, electrode wire 254, and electrical power to the welding application. As discussed in more detail below, the welding power supply 212 is configured to receive input power, convert a first portion of the input power to welding power and output the welding power to a weld circuit, and to convert a second portion of the input power to preheating power and output the preheating power to a preheating circuit or other preheater.

The example torch 214 includes a first contact tip 218 and a second contact tip 220. The electrode wire 254 is fed from the wire feed assembly 260 to the torch 214 and through the contact tips 218, 220, to produce a welding arc 226 between the electrode wire 254 and the workpiece 244. The preheating circuit includes the first contact tip 218, the second contact tip 220, and a portion 256 of the electrode wire 254 that is located between the first contact tip 218 and a second contact tip 220. The example power supply 212 is further coupled to the work cable 242 that is coupled to the workpiece 244.

In operation, the electrode wire 254 passes through the second contact tip 220 and the first contact tip 218, between which the power conversion circuitry 230 outputs a preheating current to heat the electrode wire 254. Specifically, in the configuration shown in FIG. 1A, the preheating current enters the electrode wire 254 via the second contact tip 220 and exits via the first contact tip 218. However, the preheating current may be conducted in the opposite direction, using AC, or a combination of AC and DC. At the first contact tip 218, a welding current may also enter (or exit) the electrode wire 254.

The welding current is output by the power conversion circuitry 230, which derives the preheating power and the welding power from the primary power 222. The welding current flows between the electrode wire 254 and the workpiece 244, which in turn generates the welding arc 226. When the electrode wire 254 makes contact with the workpiece 244, or when an arc exists between the electrode wire 254 and the workpiece 244, an electrical circuit is completed and the welding current flows through the electrode wire 254, across the arc 226, across the metal work piece(s) 244, and returns to the power conversion circuitry 230 via a work cable 242. The welding current causes the electrode wire 254 and the parent metal of the work piece(s) 244 to melt, thereby joining the work pieces as the melt solidifies. By preheating the electrode wire 254, the welding arc 226 may be generated with drastically reduced arc energy. Generally speaking, the preheating current is proportional to the distance between the contact tips 218, 220 and the electrode wire 254 size.

During operation, the power conversion circuitry 230 establishes a preheating circuit to conduct preheating current through a section 256 of the electrode wire 254. The preheating current flows from the power conversion circuitry 230 to the second contact tip 220 via a first conductor 270, through the section 256 of the electrode wire 254 to the first contact tip 218, and returns to the power conversion circuitry 230 via a second conductor 272 connecting the power conversion circuitry 230 to the first contact tip 218. Either, both, or neither of the conductors 270, 272 may be combined with other cables or conduits. For example, the conductor 270 or the conductor 272 may be part of the cable 250. In other examples, the conductor 272 is included within the cable 250, and the conductor 270 is routed separately to the torch 214. To this end, the power supply 212 may include between one and three terminals to which one or more cables can be physically connected to establish the preheating, welding, and work connections. For example, multiple connections can be implemented into a single terminal using appropriate insulation between different connections.

In the illustrated example of FIG. 1A, the power supply 212 includes two terminals 274, 276 configured to output the welding power to the contact tip 220 and the work cable 242. The conductor 272 couples the terminal 274 to the torch 214, which provides the power from the conductor 272 to the contact tip 218. The work cable 242 couples the terminal 276 to the workpiece 244. The example terminals 274, 276 may have designated polarities, or may have reversible polarities.

Because the preheating current path is superimposed with the welding current path over the connection between the first contact tip 218 and the power conversion circuitry 230 (e.g., via conductor 272), the cable 250 may enable a more cost-effective single connection between the first contact tip 218 and the power conversion circuitry 230 (e.g., a single cable) than providing separate connections for the welding current to the first contact tip 218 and for the preheating current to the first contact tip 218.

The example power supply 212 includes a housing 286, within which the control circuitry 232, the power conversion circuitry 230, the wire feed assembly 260, the user interface 234, or the gas control valving 246 are enclosed. In examples in which the power conversion circuitry 230 includes multiple power conversion circuits (e.g., a preheating power conversion circuit and a welding power conversion circuit), all of the power conversion circuits are included within the housing 286.

Figure 1B:
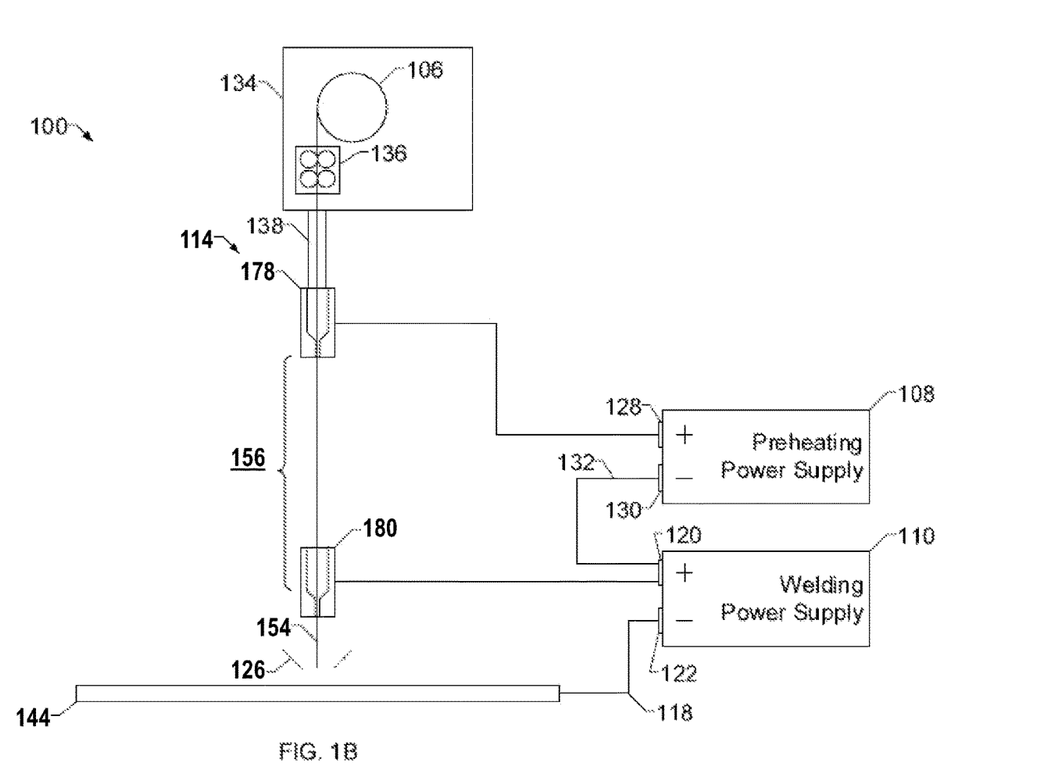
FIG. 1B illustrates another example welding system including a welding power supply configured to convert input power to welding power and a preheating power supply configured to convert input power to preheating power, in accordance with aspects of this disclosure.

FIG. 1B illustrates another example welding system 100 including a welding power supply 110 configured to convert input power to welding power and a preheating power supply 108 configured to convert input power to preheating power. The welding system 100 includes the example torch 114 having the contact tips 178, 180. The system 100 further includes the electrode wire 154 fed from a wire spool 106, a preheating power supply 108, and a welding power supply 110. The system 100 is illustrated in operation as producing the welding arc 126 between the electrode wire 154 and a workpiece 144.

In the example of FIG. 1B, the system 100 includes separate power supplies 108, 110 to provide the welding power and the preheating power to the torch 114, instead of the single power supply 212 in the example of FIG. 1A.

In operation, the electrode wire 154 passes from the wire spool 106 through the second contact tip 180 and the first contact tip 178, between which the preheating power supply 108 generates a preheating current to heat the electrode wire 154. Specifically, in the configuration shown in FIG. 1B, the preheating current enters the electrode wire 154 via the second contact tip 180 and exits via the first contact tip 178. The example preheating power supply 108 may implement a controlled voltage control loop or a controlled current control loop to control the voltage or current output to the preheating circuit.

At the first contact tip 178, a welding current may also enter the electrode wire 114. The welding current is generated, or otherwise provided by, the welding power supply 110. The welding current flows between the electrode wire 154 and the workpiece 144, which in turn generates the welding arc 126. When the electrode wire 154 makes contact with a target metal workpiece 106, or when an arc exists between the electrode wire 154 and the workpiece 144, an electrical circuit is completed and the welding current flows through the electrode wire 154, across the arc 126, across the metal work piece(s) 144, and returns to the welding power supply 110. The welding current causes the electrode wire 154 and the parent metal of the work piece(s) 144 to melt, thereby joining the work pieces as the melt solidifies. By preheating the electrode wire 154, a welding arc 126 may be generated with drastically reduced arc energy. Generally speaking, the preheating current is proportional to the distance between the contact tips 178, 180 and the electrode wire 154 size.

The welding current is generated, or otherwise provided by, a welding power supply 110, while the preheating current is generated, or otherwise provided by, the preheating power supply 108. The preheating power supply 108 and the welding power supply 110 may ultimately share a common power source (e.g., a common generator or line current connection), but the current from the common power source is converted, inverted, or regulated to yield the two separate currents—the preheating current and the welding current. For instance, the preheat operation may be facilitated with a single power source and associated converter circuitry, in which case three leads may extend from a single power source.

During operation, the system 100 establishes a welding circuit to conduct welding current from the welding power supply 110 to the first contact tip 18, and returns to the power supply 110 via the welding arc 112, the workpiece 106, and a work lead 118. To enable connection between the welding power supply 110 and the first contact tip 18 and the workpiece 144, the welding power supply 110 includes terminals 120, 122 (e.g., a positive terminal and a negative terminal).

During operation, the preheating power supply establishes a preheating circuit to conduct preheating current through a section 156 of the electrode wire 154. To enable connection between the preheating power supply 108 and the contact tips 18, 20, the preheating power supply 108 includes terminals 128, 130. The preheating current flows from the preheating power supply 108 to the second contact tip 180, the section 156 of the electrode wire 154, the first contact tip 178, and returns to the preheating power supply 108 via a cable 132 connecting the terminal 120 of the welding power supply 110 to the terminal 130 of the preheating power supply 108.

Because the preheating current path is superimposed with the welding current path over the connection between the first contact tip 178 and the power supplies 108, 110, the cable 132 may enable a more cost-effective single connection between the first contact tip 178 and the power supplies 108, 110 (e.g., a single cable) than providing separate connections for the welding current to the first contact tip 178 and for the preheating current to the first contact tip 178. In other examples, the terminal 130 of the preheating power supply 108 is connected to the first contact tip 178 via a separate path than the path between the first contact tip 178 and the welding power supply 110.

As illustrated in FIG. 1B, the example system 100 includes a wire feeder 134 that feeds the electrode wire 154 to the torch 114 using a wire drive 136. The electrode wire 154 exits the wire feeder 134 and travels through a wire liner 138.

Figure 2:
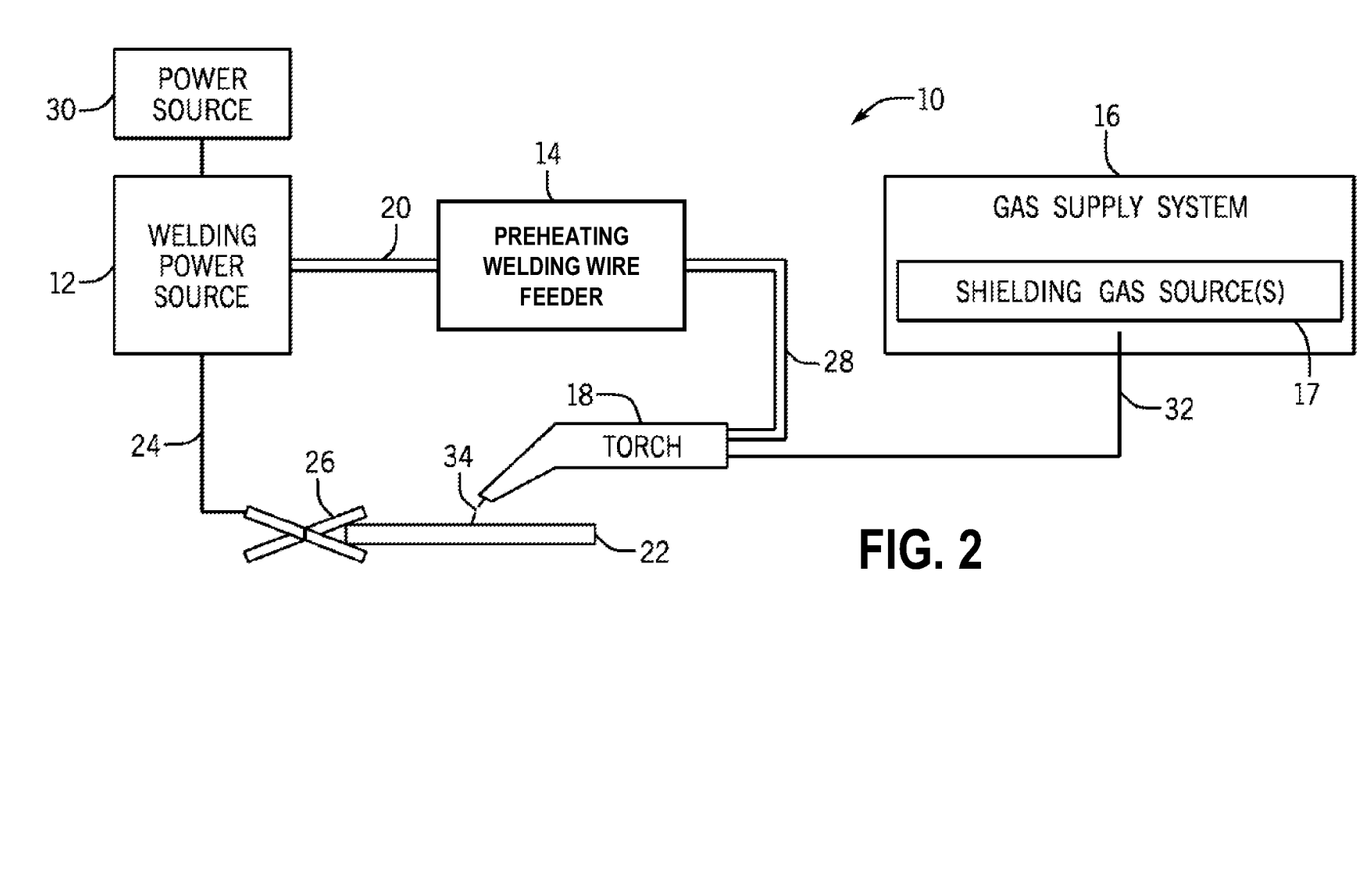
FIG. 2 is a block diagram of a metal-cored arc welding (MCAW) system, in accordance with aspects of this disclosure.

FIG. 2 illustrates an embodiment of a metal-cored arc welding (MCAW) system 10 that utilizes a metal-cored tubular welding wire, in accordance with the present disclosure. The welding system 10 includes a welding power source 12, a preheating welding wire feeder 14, a gas supply system 16, and a welding torch 18. The welding power source 12 generally supplies power to the welding system 10 and may be coupled to the preheating welding wire feeder 14 via a cable bundle 20 as well as coupled to a workpiece 22 using a lead cable 24 having a clamp 26. In the illustrated embodiment, the preheating welding wire feeder 14 is coupled to the welding torch 18 via a cable bundle 28 in order to supply consumable, metal-cored welding wire (i.e., the tubular welding electrode) and power to the welding torch 18 during operation of the welding system 10. In another embodiment, the welding power unit 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power source 12 may power the preheating welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the preheating welding wire feeder 14, and the preheating welding wire feeder 14 may regulate the flow of gas from the gas supply system 16 to the welding torch 18. A shielding gas, as used herein, may refer to any gas or mixture of gases that may be provided to the arc or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, Ar/$CO_2$ mixtures (e.g., between 1% and 99% $CO_2$ in Ar), Ar/$CO_2$/$O_2$ mixtures, Ar/He mixtures, and so forth. By specific example, in certain embodiments, the shielding gas flow may include 100% Ar; 75% Ar and 25% $CO_2$; 90% Ar and 10% $CO_2$; or 98% Ar and 2% $O_2$.

Accordingly, the illustrated welding torch 18 generally receives the metal-cored welding wire, power from the preheating welding wire feeder 14, and a shielding gas flow from the gas supply system 16 in order to perform MCAW of a workpiece 22. During operation, the welding torch 18 may be brought near the workpiece 22 so that an arc 34 may be formed between the consumable metal-cored welding wire exiting a contact tip of the welding torch 18 and the workpiece 22. Additionally, as discussed below, by controlling the composition of the metal-cored welding wire, the chemistry of the arc 34 or the resulting weld (e.g., composition and physical characteristics) may be varied. For example, the metal-cored welding wire includes alloying components that may become at least partially incorporated into the weld deposit, affecting the mechanical properties of the weld. Furthermore, other components of the disclosed metal-cored welding wire may aid in wetting the surface of the workpiece 22 (e.g., sulfur or a bead wetting agent), and assist in locating silicon island formation to facilitate better removal (e.g., the bead wetting agent).

Figure 3:
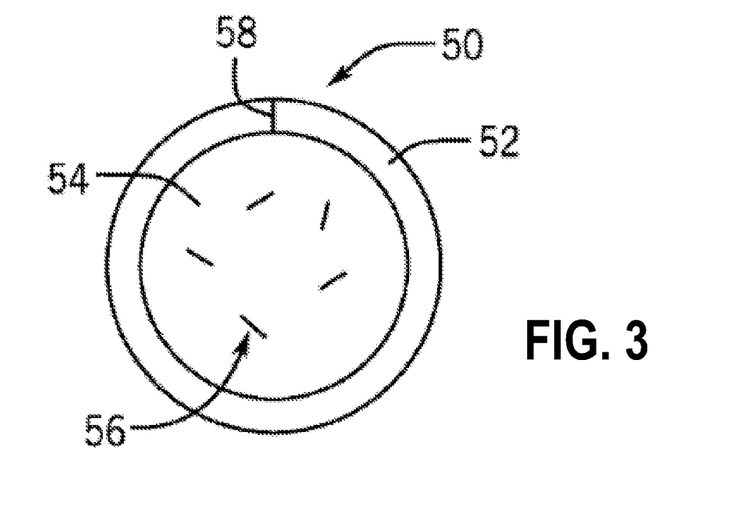
FIG. 3 is a cross-sectional view of a metal-cored welding wire with a butt seam, in accordance with aspects of this disclosure.

FIG. 3 illustrates a cross-section of an embodiment according to the present disclosure. FIG. 3 illustrates a metal-cored tubular welding wire 50 that includes a metallic sheath 52, which encapsulates a granular or powdered core 54 (also referred to as filler). The metal-cored welding wire 50 illustrated in FIG. 3 features a butt seam or weld 58. The metallic sheath 52 of the metal-cored welding wire 50 illustrated in FIG. 3 may be manufactured from any suitable metal or alloy, such as steel. It should be appreciated that the composition of the metallic sheath 52 may affect the composition of the resulting weld or the properties of the arc 34. In certain embodiments, the metallic sheath 52 may account for between approximately 60% and 95%, or between approximately 60% and 90%, or between approximately 74% and 76%, of the total weight of the tubular welding wire 50. Additionally, in certain embodiments, the metallic sheath 52 may be made of mostly iron, with various inclusions (e.g., carbon, manganese) to adjust the desired properties of the metallic sheath 52 and the resulting weld deposit.

The granular core 54 of the illustrated metal-cored welding wire 50 may generally be a compacted powder. In certain embodiments, the granular core 54 may account for between approximately 5% and approximately 40%, or between approximately 20% and approximately 30%, or between approximately 22% and approximately 26%, of the total weight of the metal-cored welding wire 50. For example, in certain embodiments, the granular core 54 may provide approximately 20%, approximately 21%, approximately 22%, approximately 23%, approximately 24%, approximately 25%, approximately 26% approximately 27%, approximately 28%, approximately 29%, or approximately 30%, of the total weight of the tubular welding wire 50. In certain embodiments, the components of the granular core 54, discussed below, may be homogenously or non-homogenously (e.g., in clumps or clusters 56) disposed within the granular core 54. In certain embodiments, components such as sulfur; carbon; one or more of antimony, selenium, tellurium, arsenic, gallium, bismuth, and tin; and nickel may be included in the granular core 54. Furthermore, it may be appreciated that, in certain embodiments, the metal-cored welding wire 50 may be completely or substantially free of indium (e.g., may not include any intentional addition of indium).

Figure 4:
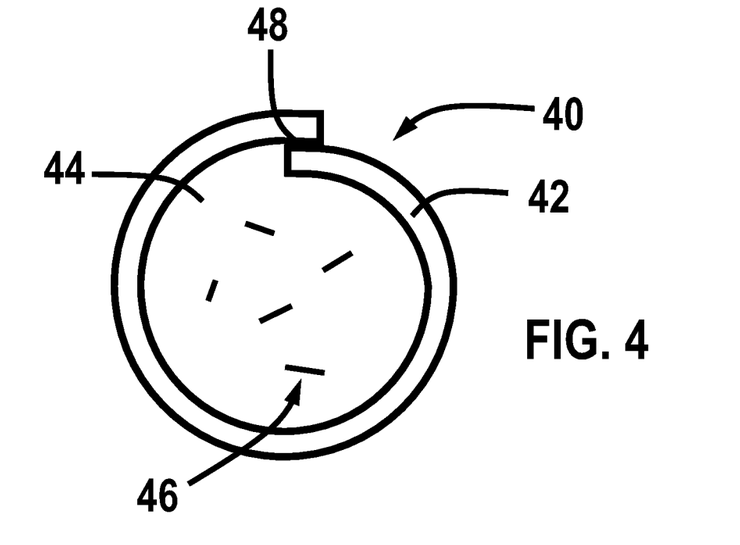
FIG. 4 is a cross-sectional view of a metal-cored welding wire with a lap seam, in accordance with aspects of this disclosure.

FIG. 4 illustrates a cross-section of an embodiment according to the present disclosure. FIG. 4 illustrates a metal-cored tubular welding wire 40 that includes a metallic sheath 42, which encapsulates a granular or powdered core 44. The metal-cored welding wire 40 illustrated in FIG. 4 features a lap seam or weld 48. The lap seam may provide certain advantages as the granular core 44 accounts for a higher weight percentage of the metal-cored welding wire 40. For example, in certain embodiments, a lap seam may help ensure that the contents of the granular core 44 remain encapsulated by the metallic sheath 42. In certain embodiments, the components of the granular core 44, discussed below, may be homogenously or non-homogenously (e.g., in clumps or clusters 46) disposed within the granular core 44. Apart from the lap seam, the metal-cored welding wire 40 of FIG. 4 may be the same as the metal-cored welding wire 50 illustrated in FIG. 3.

In certain embodiments, a metal-cored tubular welding wire may include a metallic sheath that encapsulates a granular or powdered core that has no seam (and is thus a seamless wire). The fact that the metal-cored welding wire may be seamless may provide certain advantages as the granular core accounts for a higher weight percentage of the metal-cored welding wire. For example, in certain embodiments, a seamless wire may help ensure that the contents of the granular core remain encapsulated by the metallic sheath. Apart from being seamless, the seamless metal-cored welding wire may be the same as the metal-cored welding wire illustrated in FIGS. 3-4.

In certain embodiments, sulfur (which could be provided in the form of, for example, potassium sulfate) may account for between approximately 0.01% and approximately 0.12%, between approximately 0.02% and approximately 0.10%, or between approximately 0.03% and approximately 0.08% of the metal-cored welding wire 50 by weight. In certain embodiments, sulfur may account for between approximately 0.01% and approximately 0.03%, between approximately 0.015% and approximately 0.025%, between approximately 0.016% and approximately 0.024%, between approximately 0.017% and approximately 0.022%, or between approximately 0.018% and approximately 0.020% of the granular core 54 by weight. It may be appreciated that, in certain embodiments, sulfur may be implemented as part of a lubricating or corrosion-resistant coating disposed on an outer surface of the metal-cored welding wire 50. For example, in certain embodiments, sulfur may be included in the form of molybdenum sulfide, or another suitable sulfur-based lubricant, coated onto the outer surface of the metal sheath 52 of the metal-cored welding wire 50. However, it is believed that delivering sulfur to the weld pool via the granular core 54 of the metal-cored welding wire 50 may provide greater control over the amount and rate of delivery sulfur to the weld pool or provides a better vehicle for delivering sulfur to the weld pool to improve the wetting of the surface of the workpiece. This improved control in the delivery of sulfur is helpful since exceeding a particular threshold (e.g., approximately 0.6 wt. % or approximately 0.3 wt. %) in sulfur content within the weld deposit may result in cracking, weakening the mechanical strength of the weld deposit. It may be noted that it is also presently considered that, in certain embodiments, the sulfur source may, additionally or alternatively, be a sulfur-containing gas (e.g., sulfur hexafluoride ($SF_6$)) that is provided by the gas supply system 16 (e.g., as a mixture with the shielding gas).

In certain embodiments, a bead wetting agent may be included. The bead wetting agent may comprise one or more of selenium, tellurium, arsenic, gallium, bismuth, and tin. The bead wetting agent may account for between approximately 0.01% and approximately 0.15%, between approximately 0.03% and approximately 0.09%, between approximately 0.04% and approximately 0.07%, or approximately 0.05% of the metal-cored welding wire 50 by weight. In certain embodiments, the bead wetting agent may include only one of selenium, tellurium, arsenic, gallium, bismuth, and tin. In other embodiments, the bead wetting agent may include more than one of selenium, tellurium, arsenic, gallium, bismuth, and tin. In other embodiments, the bead wetting agent may instead be alloyed into the composition of the metal sheath 52 of the metal-cored welding wire 50. Certain embodiments of the metal-cored welding wire 50 may not include additions of selenium, tellurium, arsenic, gallium, bismuth, or tin.

In certain embodiments, the metal-cored welding wire 50 includes carbon present in the sheath 54, the core 52, or a combination thereof, to stabilize the arc 34 or increase the carbon content of the weld. Carbon may be included in the core 52 in the form of graphite, carbon black, or another carbon source. Carbon may account for between 0% and approximately 0.12%, between approximately 0.005% and approximately 0.10%, between approximately 0.01% and approximately 0.08%, or approximately 0.07% of the metal-cored welding wire 50 by weight. In certain embodiments, carbon may account for between 0% and approximately 0.05%, between approximately 0.01% and approximately 0.025%, between approximately 0.01% and approximately 0.02%, or approximately 0.15% of the metal-cored welding wire 50 by weight.

In certain embodiments, the metal-cored welding wire 50 includes nickel present in the sheath 54, the core 52, or a combination thereof, to enhance the strength and toughness of the welding wire 50 or the weld deposit. Nickel may account for between approximately 0.0 wt. % and approximately 1.0 wt. %, or between 0.25 wt. % and approximately 0.75 wt. %, or approximately 0.5 wt. % nickel of the metal-cored welding wire 50 by weight.

In certain embodiments, the metal-cored welding wire 50 includes manganese present in the sheath 54, the core 52, or a combination thereof. Manganese may account for between approximately 0.5 wt. % and approximately 3 wt. %, or between approximately 1.0 wt. % and approximately 2.5 wt. %, or approximately 2 wt. % of the metal-cored welding wire 50 by weight. In certain embodiments, manganese may account for between 0% and approximately 0.75%, between approximately 0.1% and approximately 0.5%, between approximately 0.2% and approximately 0.3%, or approximately 0.25% of the metal-cored welding wire 50 by weight.

In certain embodiments, the metal-cored welding wire 50 includes silicon present in the sheath 54, the core 52, or a combination thereof. Silicon may account for between approximately 0.0 wt. % and approximately 2.0 wt. %, or between approximately 0.5 wt. % and approximately 1.5 wt. %, or approximately 1 wt. % of the metal-cored welding wire 50 by weight.

In certain embodiments, the metal-cored welding wire 50 includes titanium present in the sheath 54, the core 52, or a combination thereof. Silicon may account for between approximately 0.0 wt. % and approximately 0.5 wt. %, or between approximately 0.01 wt. % and approximately 0.01 wt. %, or approximately 0.05 wt. % of the metal-cored welding wire 50 by weight.

Figure 5:
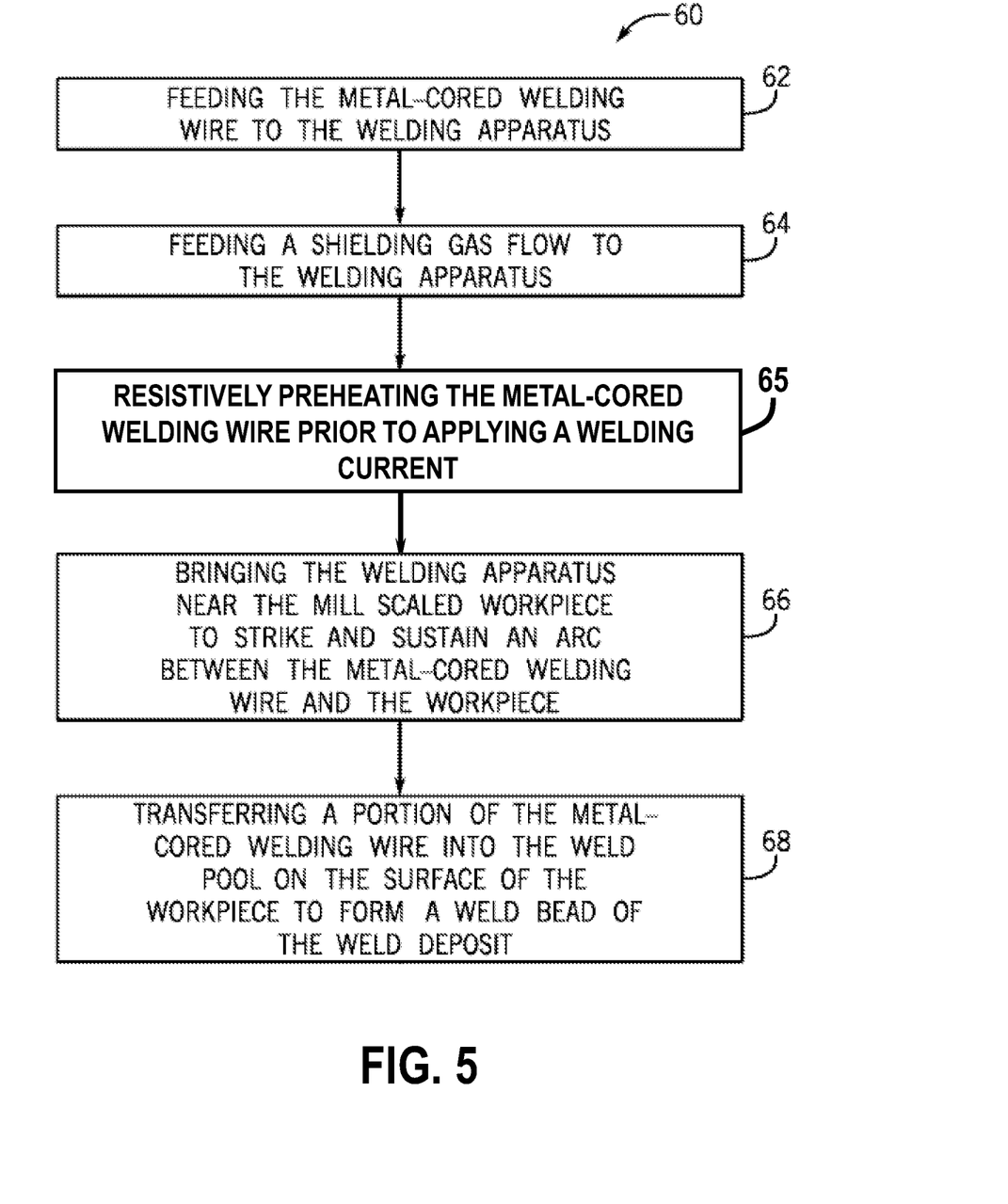
FIG. 5 is a process by which the metal-cored welding wire may be used to weld a workpiece, in accordance with aspects of this disclosure.

FIG. 5 illustrates an embodiment of a process 60 by which a workpiece 22 may be welded using the disclosed welding system 10 and the metal-cored tubular welding wire 50. The illustrated process 60 begins with feeding (block 62) the tubular welding wire 50 to a welding apparatus (e.g., welding torch 18). In certain embodiments, the metal-cored welding wire 50 may include sulfur, a bead wetting agent, and a granular core that comprises 20-30 wt. % of the metal-cored welding wire electrode. Additionally, the process 60 may include providing (block 64) a shielding gas flow (e.g., 100% argon, 100% carbon dioxide, 75% argon/25% carbon dioxide, 90% argon/10% carbon dioxide, or similar shielding gas flow) near the contact tip of the welding apparatus (e.g., the contact tip of the torch 18).

Next, the metal-cored welding wire may be resistively preheated (block 65) prior to applying a welding current. Then, the welding apparatus (e.g., welding torch 18) may be brought near (block 66) the workpiece 22 to strike and sustain an arc 34 between the metal-cored welding wire 50 and the workpiece 22. It should be appreciated that the arc 34 may be produced using, for example, a DCEP, DCEN, DC variable polarity, pulsed DC, balanced or unbalanced AC power configuration for the MCAW system 10. Once the arc 34 has been established to the workpiece 22, a portion of the metal-cored welding wire 50 (e.g., filler metals, such as iron, and alloying components, such as boron) may be transferred (block 68) into the weld pool on the surface of the workpiece 22 to form a weld bead of a weld deposit. The components of the disclosed embodiments of the metal-cored welding wire 50 cooperate to form quality welds on steel that have a good appearance (e.g., no "cooked" appearance or substantial dimples, divots, or depressions) and good mechanical properties.

The metal-cored welding wire electrode may be configured to produce a weld deposit at a wire feed rate of 800 to 1000 inches per minute at an amperage of 400 to 500 amps for a 0.052 inch diameter wire electrode. This amperage may represent a drop (e.g., approximately 40-50 amps) from traditional construction metal-cored wire electrodes with lower fill levels. In certain embodiments, the metal-cored welding wire electrode may have a diameter of 0.052 inches. In other embodiments, the metal-cored welding wire electrode may have a diameter of $1/16$ inches. Similar gains in wire feed rate (or reductions in amperage) may be realized with the higher fill rate for different diameter wires. An 800 to 1000 inches per minute wire feed rate for a $1/16"$ diameter wire electrode would generate higher amperage and deposition rate (in pounds) than 800 to 1000 inches per minute wire feed rate for a 0.052" wire electrode.

In terms of physical properties, in certain embodiments, the disclosed metal-cored welding wires 50 are capable of producing weld deposits in accordance with American Welding Society (AWS) 5.18 or 5.20. As such, in certain embodiments, the disclosed metal-cored welding wires 50 can produce a weld deposit having a ultimate tensile strength (UTS) of at least 70 kilopound per square inch (ksi), and a Charpy-V-Notch toughness greater than 20 foot-pounds (ft-lbs) at $-20°$ F. and at $-40°$ F. The example weld deposit of Table 4 provides an UTS of approximately 114 ksi, a yield strength of approximately 99.4 ksi, and a minimum elongation of approximately 15.5%. Additionally, the example weld deposit exhibited a Charpy-V-Notch toughness of approximately 22 foot-pounds (ft-lbs) at approximately $-20°$ F., and approximately 25 ft-lbs at $-40°$ F. It may be appreciated that the formulation of the metal-cored welding wire 50 may be modified to tune the properties of the weld, for example, to increase the strength or ductility of the weld to meet the demands of particular applications.

Figure 6:
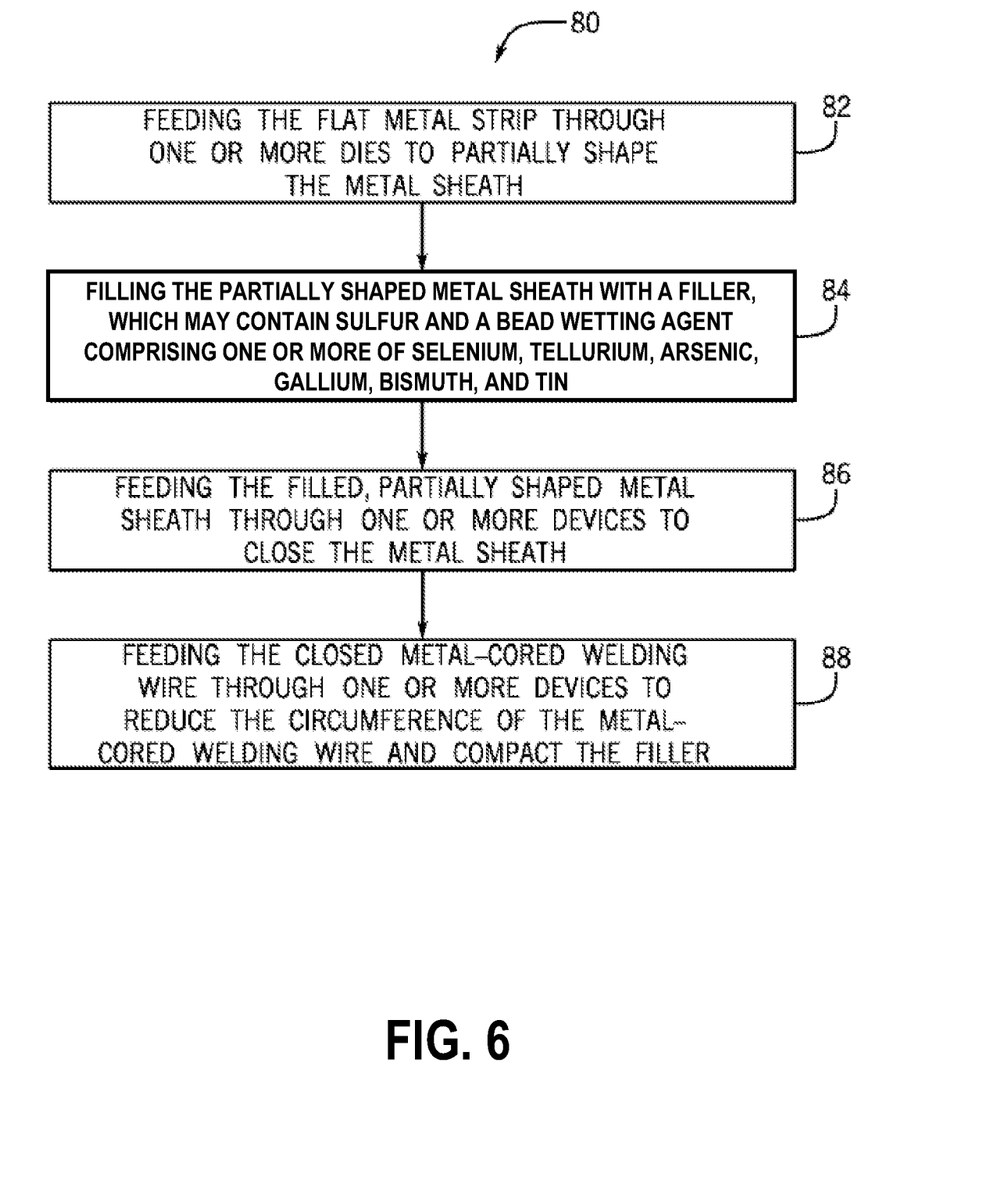
FIG. 6 is a process for manufacturing the metal-cored welding wire, in accordance with aspects of this disclosure.

FIG. 6 illustrates an embodiment of a process 80 by which the metal-cored tubular welding wire 50 may be manufactured. It may be appreciated that the process 80 merely provides an example of manufacturing a metal-cored welding wire 50; however, in other embodiments, other methods of manufacturing may be used to produce the metal-cored welding wire 50 without negating the effect of the present approach. That is, for example, in certain embodiments, the tubular welding wire 50 may be formed via a roll-forming method or via packing the core composition into a hollow metallic sheath. The process 80 illustrated in FIG. 6 begins with a flat metal strip being fed (block 82) through a number of dies that shape the strip into a partially circular metal sheath 52 (e.g., producing a semicircle or trough). After the metal strip has been at least partially shaped into the metal sheath 52, the metal sheath 52 may be filled (block 84) with the filler (e.g., the granular core 54). That is, the partially shaped metal sheath 52 may be filled with various components.

Next in the illustrated process 80, once the components of the granular core material 54 have been added to the partially shaped metal sheath 52, the partially shaped metal sheath 52 may then be fed through (block 86) one or more devices (e.g., drawing dies or other suitable closing devices) that may generally close the metal sheath 52 such that it substantially surrounds the granular core material 54 (e.g., forming a seam 58). The seam 58 may be, for example, a butt seam or a lap seam. Additionally, the closed metal sheath 52 may subsequently be fed through (block 88) a number of devices (e.g., drawing dies or other suitable devices) to reduce the circumference of the metal-cored welding wire 50 by compressing the granular core material 54. In certain embodiments, the metal-cored welding wire 50 may subsequently be heated or baked at between approximately 400° F. and approximately 600° F. for approximately 2 to 6 hours prior to packaging the metal-cored welding wire onto a spool, reel, or drum for transport, while, in other embodiments, the metal-cored welding wire 50 may be packaged without this baking step.

In certain embodiments, a metal-cored welding wire 50 may be copper coated. Example metal-cored welding wire electrodes may be manufactured by first providing a coated steel strip having a length and opposing planar surfaces. The material of the steel strip may be a carbon steel. Alternatively, where feasible, other metals may be used in lieu of a steel strip. The coating on the steel strip may be copper or a copper alloy. Instead of copper or a copper alloy, the coating may be formed from another metal, such as nickel or a nickel alloy, chromium or a chromium alloy, zinc or a zinc alloy, tin or a tin alloy, or aluminum or an aluminum alloy. For example, the coating may be an aluminum-silicon alloy (aluminum containing 5-11 wt. % silicon), which will result in aluminized steel when the alloy is coated onto the steel. These metals or alloys may be applied to the surface of the steel strip by plating. Plating may be electroplating or electroless plating (chemical plating). Alternatively, the coating metals or coating alloys may be applied to the surface of the steel strip by spraying. The coating is applied to either or both of the planar surfaces of the steel strip. Multiple layers of metals or alloys may be built up upon the surface of a steel strip. For example, a steel strip may be coated with a layer of a nickel or nickel alloy. The nickel-based layer may then be coated with a layer of copper or copper alloy. The nickel-based layer may be easier to plate on to the steel strip than copper, and may improve the bonding of the layers. The nickel-based layer may improve the wear resistance and corrosion resistance of the coating. Among the advantages of applying a copper or copper alloy coating to the steel strip is that, during welding of the tubular wire electrode, the copper-based coating provides improved electrical conductivity, reduced tip wear, better feeding, or fewer arcing issues.

In certain embodiments, a metal-cored welding wire 50 may be copper coated after the welding wire 50 is drawn to its final desired wire diameter. This may be particularly applicable to seamless wire electrodes. After drawing is completed, a seamless wire electrode may be copper plated. Here, there is no exposed seam that can trap or allow through to the core undesired acids or other chemicals associated with the plating process. Although such seamless wire electrodes allow for the electrodes to have a copper coating (thus improving electrical conductivity and reducing contact tip wear for welding), they can be relatively expensive to manufacture.

Some of the elements described herein are identified explicitly as being optional, while other elements are not identified in this way. Even if not identified as such, it will be noted that, in some examples, some of these other elements are not intended to be interpreted as being necessary, and would be understood by one skilled in the art as being optional.

While the present disclosure has been described with reference to certain implementations, it will be understood by those skilled in the art that various changes may be made and equivalents may be substituted without departing from the scope of the present method or system. In addition, many modifications may be made to adapt a particular situation or material to the teachings of the present disclosure without departing from its scope. For example, systems, blocks, or other components of disclosed examples may be combined, divided, re-arranged, or otherwise modified. Therefore, the present disclosure is not limited to the particular implementations disclosed. Instead, the present disclosure will include all implementations falling within the scope of the appended claims, both literally and under the doctrine of equivalents.

The invention claimed is:

1. A metal-cored welding wire electrode for high deposition rate welding comprising:
   a metallic sheath encapsulating a granular core, wherein the metallic sheath comprises between 70 at 80 wt. % and the granular core comprises between 20 and 30 wt. % of the metal-cored welding wire electrode;
   wherein the metal-cored welding wire electrode comprises, by weight of the metal-cored welding wire electrode:
      0.01 to 0.03 wt. % sulfur,
      0 to 0.12 wt. % carbon,
      0.01 to 0.15 wt. % of a bead wetting agent, and
      0 to 1 wt. % nickel; and
   wherein the bead wetting agent consists of one or more of selenium, tellurium, arsenic, gallium, and tin.

2. The metal-cored welding wire electrode of claim 1, wherein the granular core comprises the 0.01 to 0.03 wt. % sulfur, the 0 to 0.12 wt. % carbon, the 0.03 to 0.15 wt. % of the bead wetting agent, and the 0 to 1 wt. % nickel.

3. The metal-cored welding wire electrode of claim 1, wherein the granular core comprises between 22 and 26 wt. % of the metal-cored welding wire electrode.

4. The metal-cored welding wire electrode of claim 1, wherein the metal-cored welding wire electrode comprises 0.015 to 0.025 wt. % sulfur.

5. The metal-cored welding wire electrode of claim 1, wherein the metal-cored welding wire electrode comprises 0.01 to 0.08 wt. % carbon.

6. The metal-cored welding wire electrode of claim 1, wherein the metal-cored welding wire electrode comprises 0.03 to 0.09 wt. % of the bead wetting agent.

7. The metal-cored welding wire electrode of claim 1, wherein the metal-cored welding wire electrode comprises 0.25 to 0.75 wt. % nickel.

8. The metal-cored welding wire electrode of claim 1, wherein the metal-cored welding wire electrode further comprises:
   1.0 to 2.5 wt. % manganese, and
   0.5 to 1.5 wt. % silicon.

9. The metal-cored welding wire electrode of claim 1, wherein the metal-cored welding wire electrode is configured to produce a weld deposit at a wire feed rate of 800 to 1000 inches per minute at an amperage of 400 to 500 amps for a 0.052 inch diameter wire electrode.

10. The metal-cored welding wire electrode of claim 1, wherein the metal-cored welding wire electrode comprises a lap seam.

11. A method for high deposition rate welding comprising:
   resistively preheating a metal-cored welding wire electrode comprising a metallic sheath encapsulating a granulated core;
   establishing an arc between the metal-cored welding wire electrode and a workpiece; and
   melting at least a portion of the metal-cored welding wire electrode and at least a portion of the workpiece using the heat of the arc to form a weld deposit;
   wherein the metallic sheath comprises between 70 and 80 wt. % of the metal-cored welding wire electrode;
   wherein the granular core comprises between 20 and 30 wt. % of the metal-cored welding wire electrode;
   wherein the metal-cored welding wire electrode comprises, by weight of the metal-cored welding wire electrode:
      0.01 to 0.03 wt. % sulfur,
      0 to 0.12 wt. % carbon,
      0.01 to 0.15 wt. % of a bead wetting agent, and
      0 to 1 wt. % nickel; and
   wherein the bead wetting agent consists of one or more of selenium, tellurium, arsenic, gallium, and tin.

12. The method of claim 11, wherein the granular core comprises the 0.01 to 0.03 wt. % sulfur, the 0 to 0.12 wt. % carbon, the 0.03 to 0.15 wt. % of the bead wetting agent, and the 0 to 1 wt. % nickel.

13. The method of claim 11, wherein the granular core comprises between 22 and 26 wt. % of the metal-cored welding wire electrode.

14. The method of claim 11, wherein the metal-cored welding wire electrode comprises 0.015 to 0.025 wt. % sulfur.

15. The method of claim 11, wherein the metal-cored welding wire electrode comprises 0.01 to 0.08 wt. % carbon.

16. The method of claim 11, wherein the metal-cored welding wire electrode comprises 0.03 to 0.09 wt. % of the bead wetting agent.

17. The method of claim 11, wherein the metal-cored welding wire electrode comprises 0.25 to 0.75 wt. % nickel.

18. The method of claim 11, wherein the metal-cored welding wire electrode further comprises:
   1.0 to 2.5 wt. % manganese, and
   0.5 to 1.5 wt. % silicon.

19. The method of claim 11, wherein the metal-cored welding wire electrode is configured to produce a weld deposit at a wire feed rate of 800 to 1000 inches per minute at an amperage of 400 to 500 amps for a 0.052 inch diameter wire electrode.

20. The method of claim 11, wherein the metal-cored welding wire electrode comprises a lap seam.

* * * * *